(No Model.)
G. B. WIGGIN.
MACHINE FOR CUTTING TIN, &c.
No. 272,501. Patented Feb. 20, 1883.
2 Sheets—Sheet 1.
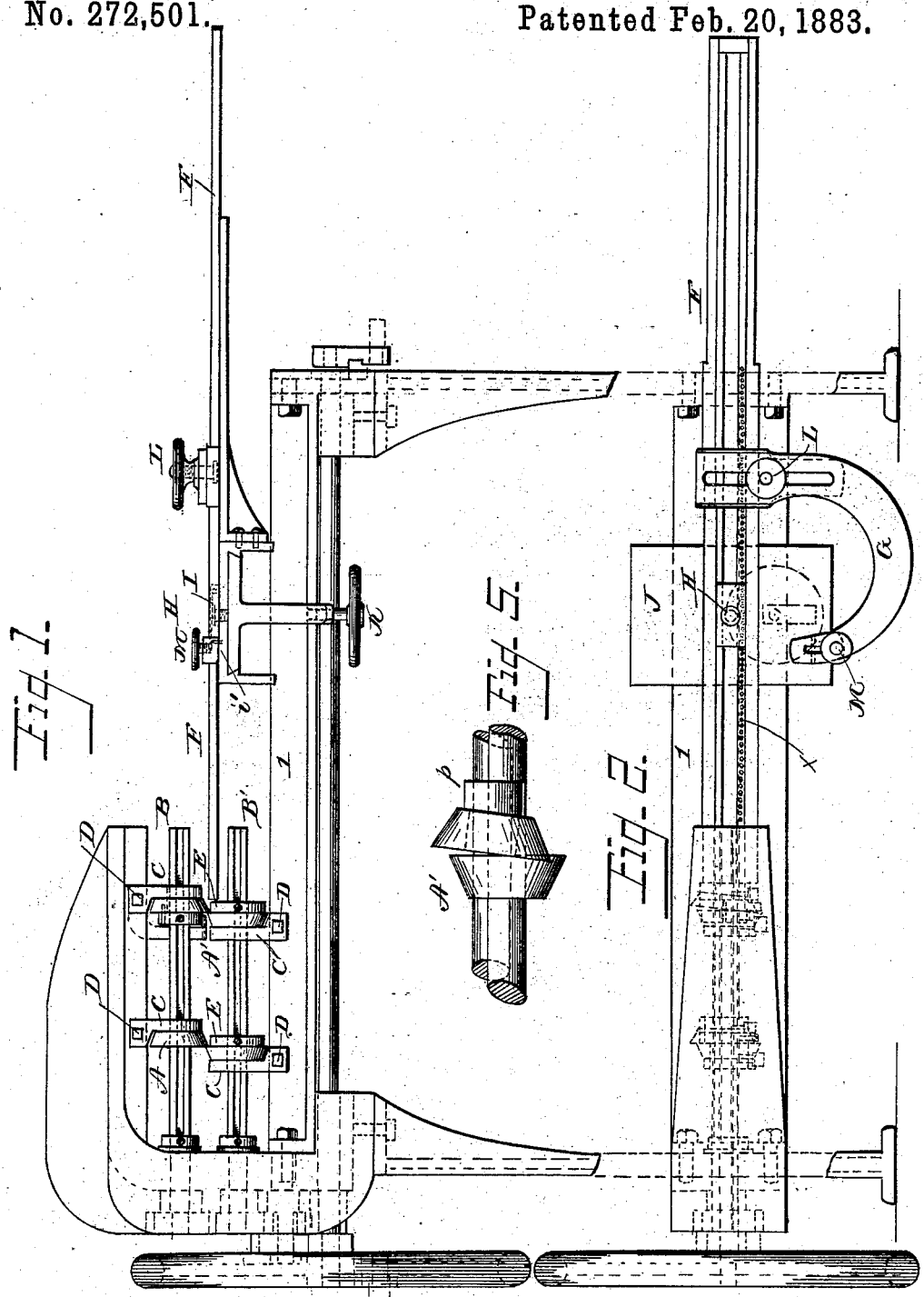
WITNESSES
F. L. Durand
C. J. Williamson
INVENTOR
George B. Wiggin
by John J. Halsted & Son his Attorneys

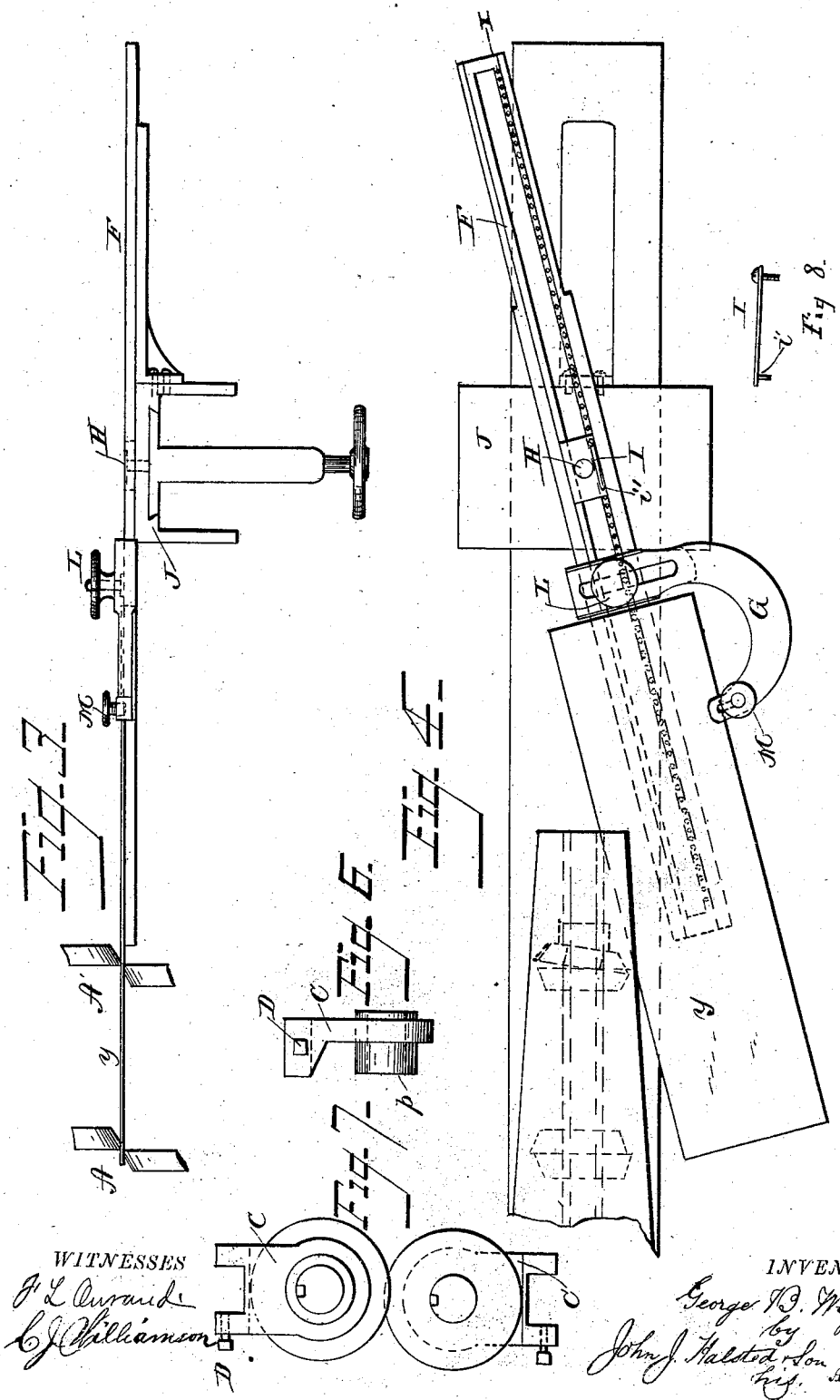

UNITED STATES PATENT OFFICE.

GEORGE B. WIGGIN, OF SOUTH NEW MARKET, NEW HAMPSHIRE, ASSIGNOR OF ONE-HALF TO JOSEPH BURNHAM, OF LAWRENCE, MASSACHUSETTS.

MACHINE FOR CUTTING TIN, &c.

SPECIFICATION forming part of Letters Patent No. 272,501, dated February 20, 1883.

Application filed September 26, 1882. (No model.)

*To all whom it may concern:*

Be it known that I, GEORGE B. WIGGIN, of South New Market, in the county of Rockingham and State of New Hampshire, have invented certain new and useful Improvements in Machines for Cutting Tin, &c.; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Ordinarily, tin and other thin sheet metal, when it is desired to cut it in pieces having an inner and outer curve in the arcs of circles, (such pieces being in the tin-shops called "segments,") have been cut by hand-shears or dies. When cut by dies they can cut only one size of segment. When cut by hand-shears it is necessary, for every piece or segment, first, to mark out the curves or arcs on the tin before using the shears, and then, even if the workman be experienced, the curves will often be more or less imperfect or rough-edged, and it requires two separate cuts for every piece or segment. Dies also have to be sharpened often, while rotating cutters will last for years.

My invention consists in a special construction of apparatus adapted for cutting both arcs or curves of the segment-strip at the same time, and for cutting such strip of any desired width between the curves, and for varying the radius of either or both sweeps or curves at option.

Figure 1 is an elevation, and Fig. 2 a plan, of a machine embodying my invention, the tongs being at the right of the pivot or center of motion of the sweep; Fig. 3, an elevation of part of the machine, showing the tongs at the left of the pivot or center of motion of the sweep; Fig. 4, a plan view of the same, and Figs. 5, 6, 7, and 8 details.

A A' are two pairs of rotary cutters, adjustably secured upon the shafts B B', these shafts being parallel with each other and made with splines to cause the cutters to revolve with them. The cutters A A', by means of the collars C E and set-screws D, may have their positions on their shafts changed, as desired, nearer to or farther from each other, to cut the segments narrower or broader, as may be needed, or to or from the center around which the tin is turned, so as to vary the radius of the arcs to be cut, the machine being adapted for cutting arcs of any circle from a radius of from six inches to seventy-two inches, or even larger, if required, and of varying these arcs by graduations of one thirty-second of an inch.

E represents collars for supporting the tin or metal.

F is an adjustable segment sweep and guide for the tongs or gripper G to move upon, said tongs serving to hold the metal while being cut, and they may be placed on either side of the pivot H, at option, and are adjustable for any width of tin.

H is a pivot or center, upon which the sweep F turns.

I is a spring-latch or detent for adjusting the different sweeps, and it has a pin, $i'$, at one end, adapted to drop into any one of the small holes $x$ of the sweep F, and thus hold it so that it cannot slide out of the position to which it may have been adjusted.

J is an adjustable stand, resting on the main frame and adapted to be moved lengthwise on frame I and to be secured in its desired place.

K is a screw for securing the stand J when adjusted.

L is a thumb-screw, by which the tongs G are adjusted, so that the center of the sheet of tin shall be in line with the center of the cutters; M, a set-screw for tightening the tongs G upon the tin.

In Figs. 3 and 4 a sheet of tin is shown at $y$, by way of illustrating its position. In Fig. 4 it is in position to receive its first cuts, the sweep-guide F having been swung around upon the pivot or center H to bring the edge of the tin to the cutters. The cutters having once taken hold of or caught the metal, they continue to draw it through by their own action. When the stand J is moved in a direction from the cutters, the guide F must be released from the pin $i'$ and moved up to the cutters, and then again held in position by means of said pin. The cutters, although, as above stated, placed on parallel shafts, are not all placed at strict right angles to these shafts, but one cutter of the inner pair, which cuts the inner or smaller arc, is set at an incline to its shaft and to its fellow cutter, being provided with a bushing or hollow stud, $p$, for this purpose, and thereby the inside of the sweep or arc of the tin which is being cut is prevented from jamming or rubbing against it, thus avoiding any rough edge to the cut. The outer pair of cutters—that is, the pair which cuts the outer or larger curve or sweep—need not be set to an incline. The cutters being first adjusted for the desired width of segment required, and the adjustable stand J being placed to give the desired radius for the circle, the tin is then placed in the tongs G, and moved to the cutters and secured by the screw M. After a segment has been cut the tongs G are fed or moved by hand toward the cutters until the whole sheet of tin is cut up.

The machine may be run by foot or by power. The two shafts are geared so as to run together, as will be seen in the drawings, each shaft having on it one of each pair of cutters. This insures the proper uniformity of cutting action. The shafts are in fixed bearings in the main frame or support N.

By this machine both arcs and any desired arcs can be simultaneously cut with clear edges, and without previously marking the line of cut, and a boy or unskilled person can run it, effecting a great saving in wages, whereas none but skilled workmen can be trusted to work dies or to cut segments with hand-shears, and only one cut at a time can be made with such shears, and even that often requires repeated actions of the shears, causing breaks in the cut. It is only necessary with my invention to set the machine at the desired sweep and pass the metal through the cutters, and with it one man can do more work than five men with hand-shears, and do it better.

I do not broadly claim two parallel shafts, each carrying two cutters, as these have been used before.

What I claim as new in a machine for cutting tin or sheet metal in segmental strips is—

1. In a machine for cutting segmental strips of metal with two pairs of rotary cutters on parallel shafts, the combination, with one of the cutters which cut the smaller arc, of a bushing which sets the cutter at an angle relatively to its fellow cutter, as and for the purpose described.

2. The combination, with the two shafts B B' and two pairs of cutters, of collars E and a bushing, $p$, which sets one of the inner cutters at an angle relatively to its fellow cutter, substantially as described.

3. The combination, with the adjustable sweep-guide F, of tongs G, pivot H, adjustable spring-latch I $i'$, and stand J, substantially as and for the purposes set forth.

4. In combination with the adjustable tongs G, the thumb-screw L, whereby the sheet of tin may be set to the proper line relatively to the cutters, as set forth.

GEORGE B. WIGGIN.

Witnesses:
ALBERT FIELD,
CHARLES E. SMITH.